(12) United States Patent  
Itoh

(10) Patent No.: US 8,176,090 B2  
(45) Date of Patent: May 8, 2012

(54) INFORMATION DELIVERING APPARATUS, INFORMATION DELIVERING METHOD, AND COMPUTER-READABLE RECORDING MEDIUM STORING INFORMATION DELIVERING PROGRAM

(75) Inventor: Hideo Itoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 438 days.

(21) Appl. No.: 12/419,631

(22) Filed: Apr. 7, 2009

(65) Prior Publication Data

US 2009/0259637 A1    Oct. 15, 2009

(30) Foreign Application Priority Data

Apr. 10, 2008    (JP) ................................ 2008-102928

(51) Int. Cl.
*G06F 17/00* (2006.01)
(52) U.S. Cl. ......................................... 707/802; 707/812
(58) Field of Classification Search .................. 707/705, 707/758, 802, 803, 804, 812
See application file for complete search history.

(56) References Cited

U.S. PATENT DOCUMENTS

| | | | | |
|---|---|---|---|---|
| 7,860,844 B2 * | 12/2010 | Ebaugh et al. | ................ | 707/696 |
| 7,889,741 B1 * | 2/2011 | Panwar et al. | ................ | 370/392 |
| 7,958,135 B2 * | 6/2011 | Katoh et al. | ................ | 707/758 |
| 8,073,708 B1 * | 12/2011 | Igoe et al. | ......................... | 705/2 |
| 2004/0111404 A1 | 6/2004 | Mano et al. | | |
| 2005/0065919 A1 | 3/2005 | Gotoh et al. | | |
| 2006/0085478 A1 * | 4/2006 | Landau et al. | ............. | 707/104.1 |
| 2008/0059485 A1 * | 3/2008 | Finn | ................. | 707/10 |
| 2008/0181500 A1 | 7/2008 | Ito et al. | | |
| 2009/0019355 A1 * | 1/2009 | Jiang et al. | .................... | 715/227 |

FOREIGN PATENT DOCUMENTS

| | | |
|---|---|---|
| JP | 2007-233910 | 9/2007 |
| JP | 2008-191703 | 8/2008 |

* cited by examiner

*Primary Examiner* — Angela Lie
(74) *Attorney, Agent, or Firm* — Oblon, Spivak, McClelland, Maier & Neustadt, L.L.P.

(57) ABSTRACT

An information delivering apparatus is disclosed. The information delivering apparatus includes a condition information obtaining section which obtains delivering destination information, a conforming information extracting section which extracts new document information stored in an information database based on the delivering destination information obtained by the condition information obtaining section in a profile information generating process which determines whether the new document information stored in the information database is to be delivered to the delivering destination, an information analyzing section which analyzes contents of the newly stored document in the information database and forms characteristic information of the newly stored document, a profile storing section which stores the characteristic information by its being related to the delivering destination information, and a new information delivering section which delivers the newly stored document information which is determined to be delivered to the delivering destination.

11 Claims, 15 Drawing Sheets

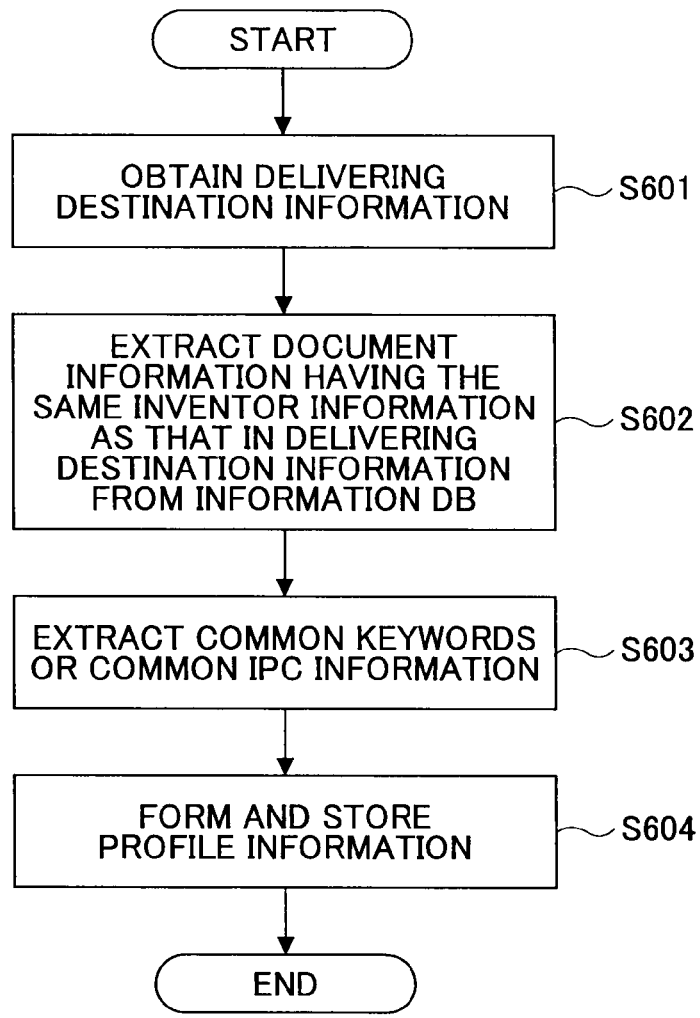

| DOCUMENT ID | DOCUMENT No. |
|---|---|
| 01 | * * * * * |
| 02 | * * * * * |
| | ⋮ |

KEYWORD$_1$

KEYWORD$_2$

KEYWORD$_3$

IPC$_1$

IPC$_2$

FIG.10

| PROFILE ID | E-MAIL ADDRESS | KEYWORD | IPC |
|---|---|---|---|
| 01 | ***@****.com | $KEYWORD_1$, $KEYWORD_2$, $\cdots$ | $IPC_1$, $IPC_2$, $\cdots$ |
| 02 | ***@****.com | $KEYWORD_3$, $KEYWORD_4$, $\cdots$ | $IPC_3$, $IPC_4$, $\cdots$ |
| | | $\cdots$ | |

FIG.12

| PROFILE ID | CONFORMING DEGREE |
|---|---|
| 01 | * * % |
| 02 | * * % |
| | ⋮ |

FIG.15

| PROFILE ID | E-MAIL ADDRESS | KEYWORD | IPC | ORGANIZATION ID |
|---|---|---|---|---|
| 01 | ***@***.com | $KEYWORD_1$, ... | $IPC_1$, $IPC_2$, ... | 001 |
| 02 | ***@***.com | $KEYWORD_2$, ... | $IPC_1$, $IPC_2$, ... | 002 |
| 03 | ***@***.com | $KEYWORD_3$, ... | $IPC_1$, $IPC_2$, ... | 001 |
| 04 | ***@***.com | $KEYWORD_4$, ... | $IPC_1$, $IPC_2$, ... | 002 |
| 05 | ***@***.com | $KEYWORD_5$, ... | $IPC_1$, $IPC_2$, ... | 002 |
| 06 | ***@***.com | $KEYWORD_6$, ... | $IPC_1$, $IPC_2$, ... | 001 |
| ... | | | | |

FIG.16

INVENTOR
INFORMATION

E-MAIL ADDRESS
INFORMATION

ORGANIZATION
INFORMATION

FIG.18

| ORGANIZATION ID | ORGANIZATION NAME |
|---|---|
| 001 | *** |
| 002 | *** |
| | ⋮ |

INFORMATION DELIVERING APPARATUS, INFORMATION DELIVERING METHOD, AND COMPUTER-READABLE RECORDING MEDIUM STORING INFORMATION DELIVERING PROGRAM

BACKGROUND OF THE INVENTION

1. Field of the Invention

The present invention generally relates to an information delivering apparatus, an information delivering method, and a computer-readable recording medium storing an information delivering program in which condition information for determining the delivery of information is formed.

2. Description of the Related Art

Recently, search technology to search for electronic data and display technology to display search results have been important due to a large amount of information to be searched for and a large amount of the search results. That is, in many cases, target information to be obtained is buried in the large amount of the search results, and the target information is very difficult to find.

Patent Document 1 discloses an SDI (selective dissemination of information) method. In the method, a relationship between conditions to search for information and a delivering destination of searched for information is stored, and when new information stored in a database where searched for information is stored satisfies the stored conditions, the new information is delivered to the delivering destination related to the conditions.

In the method of Patent Document 1, an e-mail address of a user and search conditions of information are registered beforehand. Then objects determined not to be target objects are excluded, the search conditions are applied to newly filed unexamined patent publications and their patent examination progress information, and a unit (means) is transmitted to the e-mail address so that the unit displays the searched for results.

[Patent Document 1] Japanese Unexamined Patent Publication No. 2007-233910

In order to effectively utilize the method of Patent Document 1, the search conditions must be suitably determined. However, in order to suitably determine the search conditions, proficiency is required for a user, and an inexperienced user inadequately determines the search conditions and cannot receive suitable information. Consequently, the method has not been widely used in organizations. The above problem occurs not only in patent information disclosed in Patent Document 1 but also in an information delivering system using the SDI.

SUMMARY OF THE INVENTION

In a preferred embodiment of the present invention, there is provided an information delivering apparatus, an information delivering method, and a computer-readable recording medium storing an information delivering program in which condition information for determining the delivery of information is easily formed.

Features and advantages of the present invention are set forth in the description that follows, and in part will become apparent from the description and the accompanying drawings, or may be learned by practice of the invention according to the teachings provided in the description. Features and advantages of the present invention will be realized and attained by an information delivering apparatus, an information delivering method, and a computer-readable recording medium storing an information delivering program particularly pointed out in the specification in such full, clear, concise, and exact terms so as to enable a person having ordinary skill in the art to practice the invention.

To achieve one or more of these and other advantages, according to one aspect of the present invention, there is provided an information delivering apparatus which delivers information newly stored in an information storing unit to a client. The information delivering apparatus includes a personal name information obtaining section which obtains personal name relating information of the client, an information extracting section which extracts personal name conforming information that conforms to the obtained personal name relating information including personal name information from the information storing unit, a characteristic information forming section which forms characteristic information showing characteristics of the personal name conforming information from the extracted personal name conforming information, a delivering destination information storing section which stores the characteristic information so that the characteristic information is related to delivering destination information, and an information delivering section which delivers the newly stored information to a delivering destination shown by the delivering destination information related to the characteristic information based on a conforming degree between the characteristic information of the newly stored information and the characteristic information stored in the delivering destination storing section.

BRIEF DESCRIPTION OF THE DRAWINGS

Features and advantages of the present invention will become more apparent from the following detailed description when read in conjunction with the accompanying drawings, in which:

FIG. 6 is a flowchart showing processes for storing profile information in a profile storing section shown in FIG. 3;

FIG. 7 is a diagram showing an example of delivering destination information to be obtained by a condition information obtaining section shown in FIG. 3;

FIG. 10 is a diagram showing an example of profile information stored in the profile storing section shown in FIG. 3;

FIG. 12 is a table showing an example of a relationship between a conforming degree and a profile ID shown in FIG. 10;

FIG. 15 is a diagram showing another example of the profile information stored in the profile storing section shown in FIG. 3;

FIG. 16 is a diagram showing another example of the delivering destination information to be obtained by the condition information obtaining section shown in FIG. 3;

FIG. 18 is a table showing an example of information to be stored in an organization information database shown in FIG. 17.

DESCRIPTION OF THE PREFERRED EMBODIMENTS

Best Mode of Carrying Out the Invention

The best mode of carrying out the present invention is described with reference to the accompanying drawings.

First Embodiment

In a first embodiment of the present invention, as a document information delivering system, a patent document information delivering system is described. In the patent document information delivering system, new patent document information is sequentially stored in a patent information database, and the newly stored patent document information is delivered to a predetermined delivering destination. However, the document information delivering system is not limited to the patent document information delivering system, and can be applied to, for example, an information delivering systems in a library such as a book information delivering system, a material information delivering system other than for the book information, and a painting information delivering system. The information delivering system can obtain the same effect as that of the patent document information delivering system.

Figure 1:
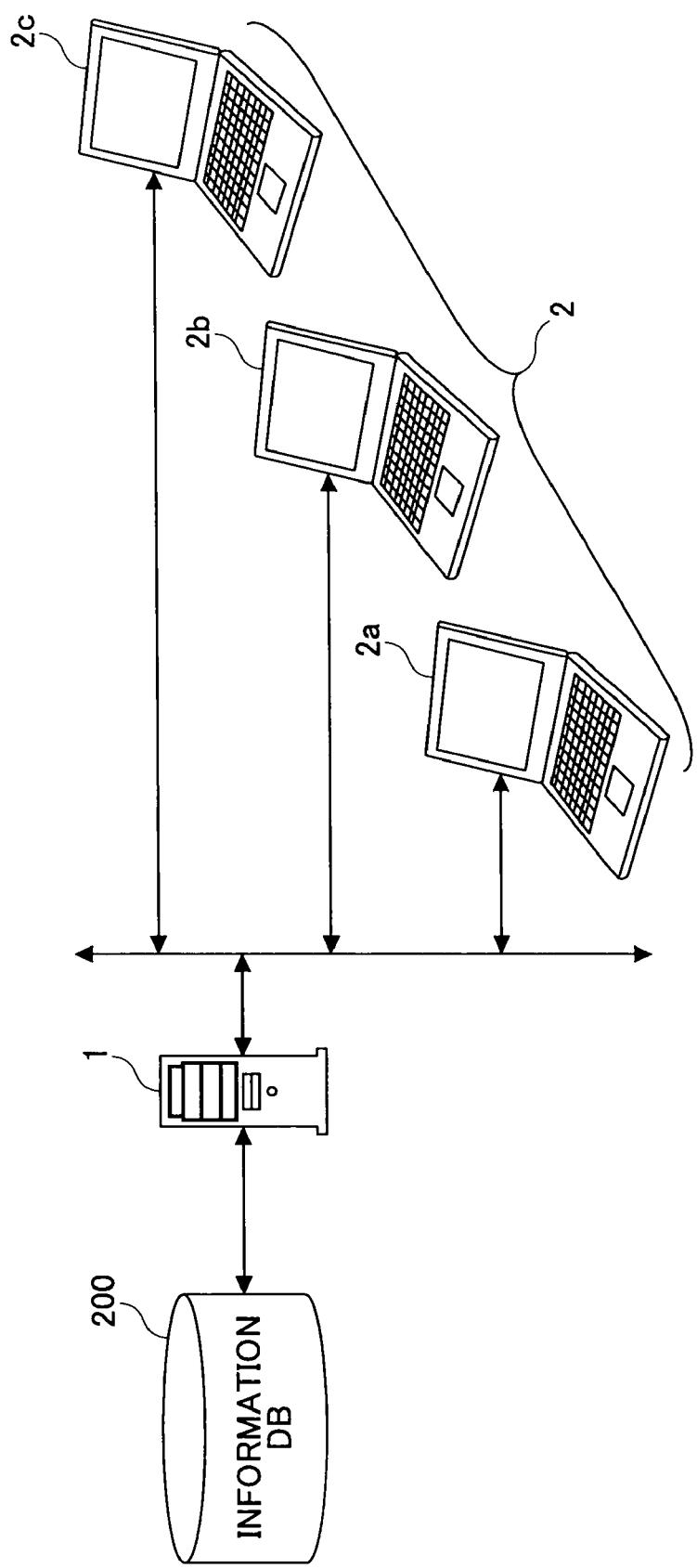
FIG. 1 is a diagram showing an information delivering system using an information delivering apparatus according to a first embodiment of the present invention.

FIG. 1 is a diagram showing the patent document information delivering system using an information delivering apparatus according to the first embodiment of the present invention. As shown in FIG. 1, the patent document information delivering system according to the first embodiment of the present invention includes an information delivering apparatus 1, plural clients 2a, 2b, and 2c, and an information DB (database) 200 (information storing unit). The clients 2a, 2b, and 2c are information processing apparatuses such as personal computers. In addition, in FIG. 1, the three clients 2a, 2b, and 2c are shown; however, the number of the clients can be one or more. In the following, in some cases, the client 2 represents the clients 2a, 2b, and 2c.

The information delivering apparatus 1 is connected to the client 2 via a network, and delivers patent document information newly stored in the information DB 200 to the client 2 under predetermined conditions. That is, the information delivering apparatus 1 functions as a document information delivering apparatus. The information DB 200 is a document information storing section in which patent document information such as unexamined patent publication information is stored. Newly applied patent document information is sequentially stored in the information DB 200.

In FIG. 1, the information DB 200 is separated from the information delivering apparatus 1. However, the information delivering apparatus 1 can include the information DB 200. The information DB 200 can be formed of a non-volatile memory, for example, an HDD.

Figure 2:
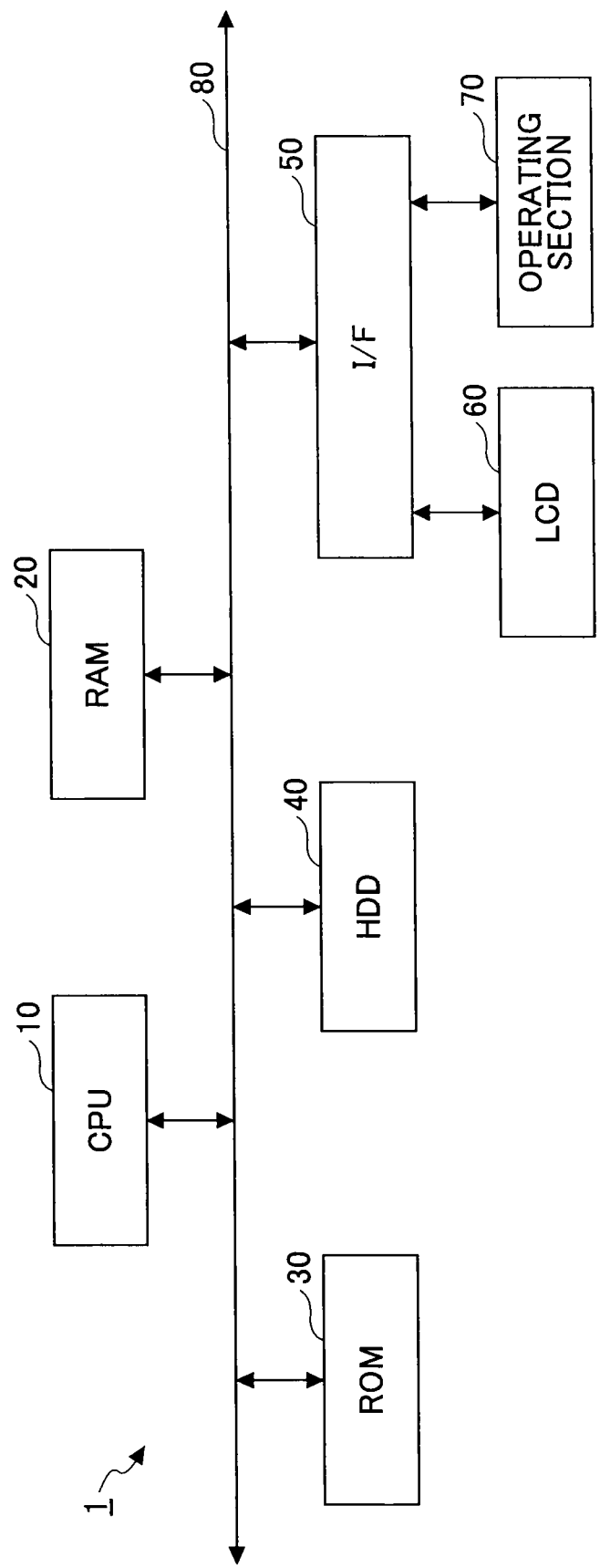
FIG. 2 is a diagram showing a hardware structure of the information delivering apparatus shown in FIG. 1.

FIG. 2 is a diagram showing a hardware structure of the information delivering apparatus 1. Referring to FIG. 2, the hardware structure of the information delivering apparatus 1 is described. As shown in FIG. 2, the information delivering apparatus 1 has a hardware structure similar to a structure of an information processing terminal such as a general-purpose server and a general-purpose PC (personal computer).

As shown in FIG. 2, the information delivering apparatus 1 includes a CPU (central processing unit) 10, a RAM (random access memory) 20, a ROM (read only memory) 30, an HDD (hard disk drive) 40, and an I/F (interface) 50; and the above elements are connected to each other via a bus 80. In addition, an LCD (liquid crystal display) 60 and an operating section 70 are connected to the I/F 50.

The CPU 10 is an operation unit and controls all operations of the information delivering apparatus 1. The RAM 20 is a volatile memory to which information can be written at high speed and from which information can be read at high speed, and is used as a memory area when the CPU 10 processes information. The ROM 30 is a read only non-volatile memory that stores programs such as firmware. The HDD 40 is a non-volatile recording medium to which information can be written and from which information can be read; and it stores an OS (operating system) and programs such as control programs and application programs.

The I/F 50 connects the LCD 60 and the operating section 70 to the bus 80. The LCD 60 is a visual user interface on which a user confirms a status of the information delivering apparatus 1. The operating section 70 is a user interface including, for example, a mouse and a keyboard, and a user inputs an instruction to the information delivering apparatus 1 by using the operating section 70. As described above, the information delivering apparatus 1 is operated as a server; therefore, the user interfaces such as the LCD 60 and the operating section 70 can be omitted from the information delivering apparatus 1.

In the above hardware structure, when a program stored in the ROM 30, the HDD 40, or a recording medium, for example, an optical disk (not shown) is loaded in the RAM 20; the program is executed by the CPU 10. With this, a software control section is established. When the hardware structure and the software control section are combined, a functional structure for establishing functions of the information delivering apparatus 1 is formed.

Figure 3:
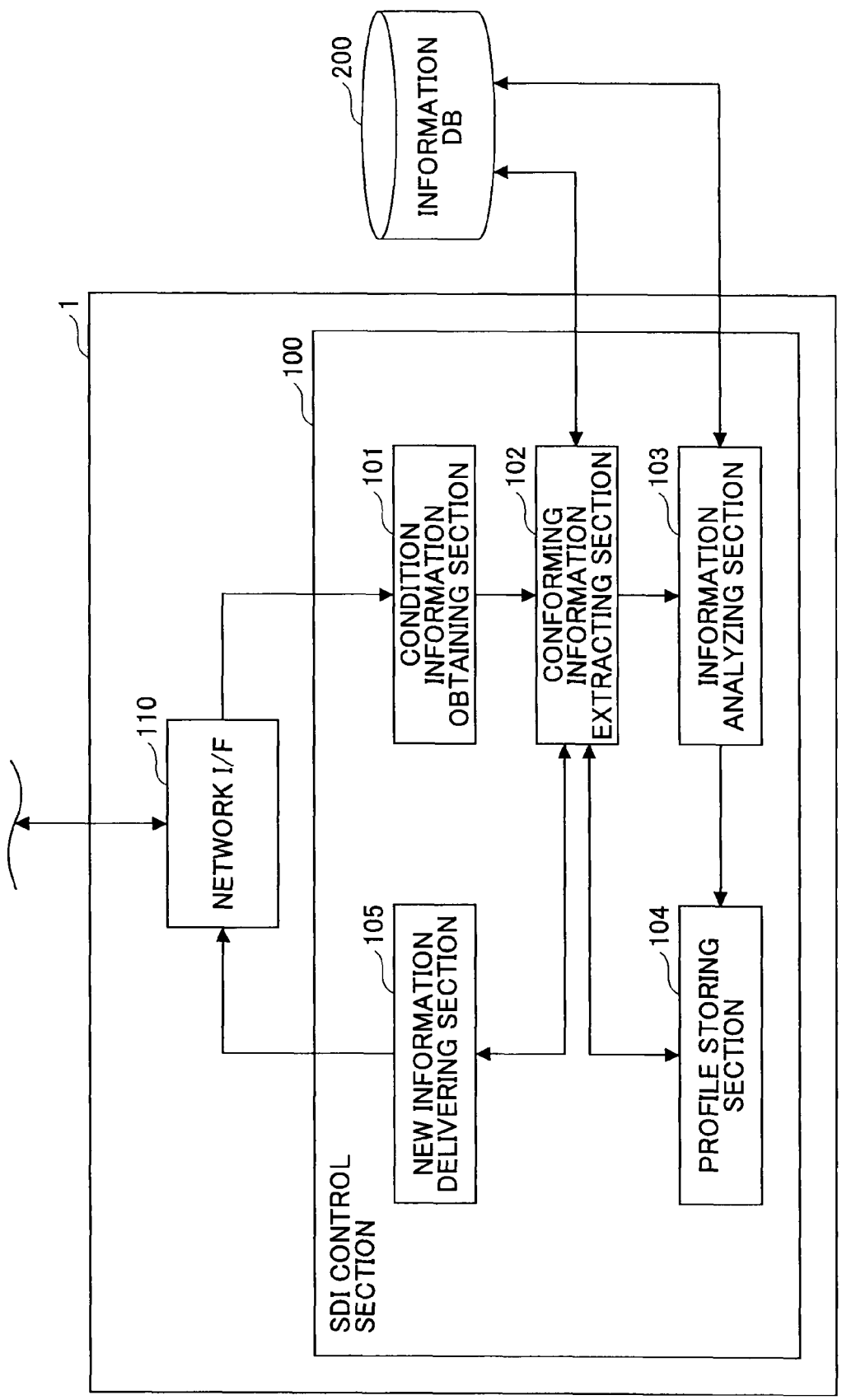
FIG. 3 is a diagram showing a functional structure of the information delivering apparatus shown in FIG. 1.

Next, referring to FIG. 3, the functional structure of the information delivering apparatus 1 is described. FIG. 3 is a diagram showing the functional structure of the information delivering apparatus 1. In FIG. 3, in addition to the functional structure of the information delivering apparatus 1, the information DB 200 is shown in which patent document information to be searched for by the information delivering apparatus 1 is stored.

As shown in FIG. 3, the information delivering apparatus 1 includes an SDI control section 100 and a network I/F 110.

The network I/F 110 is an interface by which the information delivering apparatus 1 receives information via a network and transmits information via the network; and it can be established by the I/F 50 shown in FIG. 2. Specifically, the network I/F 110 is, for example, an Ethernet interface or a USB (universal serial bus) interface.

The SDI control section 100 establishes an information delivering function of the information delivering apparatus 1, and includes a condition information obtaining section 101, a conforming information extracting section 102, an information analyzing section 103, a profile storing section 104, and a new information delivering section 105.

The condition information obtaining section 101 obtains condition information that is included in delivering destination information input to the network I/F 110 via a network. The condition information determines whether new information stored in the information DB 200 is to be delivered. The condition information obtaining section 101 is established when a program loaded in the RAM 20 (see FIG. 2) is executed by the CPU 10 (see FIG. 2).

The conforming information extracting section 102 extracts new document information stored in the information DB 200 based on the delivering destination information obtained by the condition information obtaining section 101 in a profile information forming process which determines whether the new document information stored in the information DB 200 is to be delivered to the delivering destination. That is, the conforming information extracting section 102 functions as an information extracting section for extracting document information conforming to the condition information in the delivering destination information from the information DB 200. The conforming information extracting section 102 is established when a program loaded in the RAM 20 (see FIG. 2) is executed by the CPU 10 (see FIG. 2). The conforming information extracting section 102 forms document list information (a list of the extracted document information), and sends the formed document list information to the information analyzing section 103.

In a delivering process of the document information newly stored in the information DB 200, when new patent document information is stored in the information DB 200, the conforming information extracting section 102 determines whether the newly stored patent document information is to be delivered to the client 2 (delivering destination) (see FIG. 1) based on information stored in the profile storing section 104. In the following, in some cases, the newly stored patent document information is referred to as newly stored document information. That is, the newly stored document information is document information to be delivered, and the conforming information extracting section 102 also functions as an information delivery determining section. The information delivery determining section is established when a program loaded in the RAM 20 (see FIG. 2) is executed by the CPU 10 (see FIG. 2).

The information analyzing section 103 analyzes contents of documents in the document list information by accessing the information DB 200 based on the document list information sent from the conforming information extracting section 102. The information analyzing section 103 extracts characteristic information showing characteristics of the contents of the documents in the document list information by using the analyzed result. That is, the information analyzing section 103 functions as a characteristic information forming section which forms the characteristic information showing the characteristics of the contents of the documents extracted based on the condition information obtained by the condition information obtaining section 101. The characteristic information forming section is established when a program loaded in the RAM 20 (see FIG. 2) is executed by the CPU 10 (see FIG. 2). The characteristic information formed by the information analyzing section 103 is related to delivering destination information such as an e-mail address (delivering destination) to which the document information is to be delivered and is stored in the profile storing section 104 as profile information for executing the SDI method.

The profile storing section 104 stores the profile information formed by the information analyzing section 103. That is, the profile storing section 104 functions as a delivering destination information storing section which stores the characteristic information of the contents of the documents so that the characteristic information is related to an e-mail address (delivering destination information). The profile storing section 104 is established by the HDD 400 (see FIG. 2). The e-mail address stored in the profile storing section 104 is an e-mail address of a user who uses one of the clients 2*a*, 2*b*, and 2*c*.

Since the conforming information extracting section 102 functions as the information delivery determining section, the new information delivering section 105 delivers the newly stored document information which is determined to be delivered to the client 2 via the network I/F 110. That is, the new information delivering section 105 functions as an information delivering section which delivers the newly stored document information to an e-mail address related to the characteristic information, based on a conforming degree between the characteristic information of the newly stored document information and the characteristic information stored in the profile storing section 104. The information delivering section is established when a program loaded in the RAM 20 (see FIG. 2) is executed by the CPU 10 (see FIG. 2).

Figure 4:
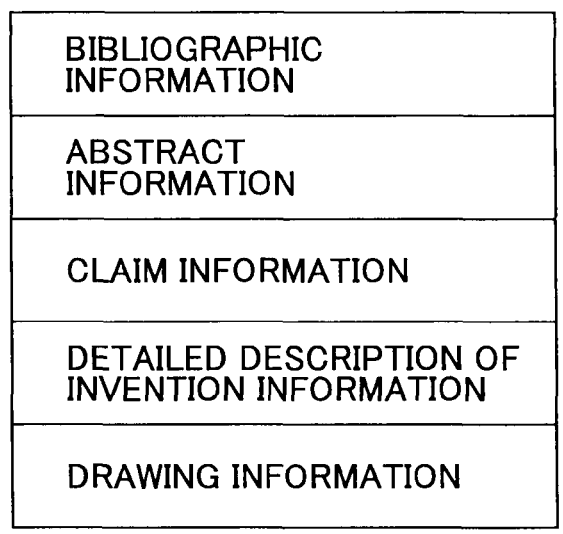
FIG. 4 is a diagram showing patent document information according to the first embodiment of the present invention.
Figure 5:
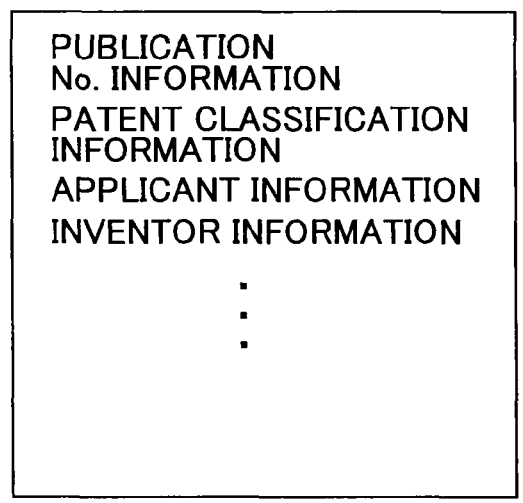
FIG. 5 is a diagram showing bibliographic information of the patent document information shown in FIG. 4.

The information DB 200 stores patent document information to be delivered to the client 2. Referring to FIG. 4, the patent document information to be stored in the information DB 200 is described. FIG. 4 is a diagram showing the patent document information. As shown in FIG. 4, the patent document information to be stored in the information DB 200 includes bibliographic information, abstract information, claim information, detailed description of invention information, and drawing information. FIG. 5 is a diagram showing the bibliographic information of the patent document information. As shown in FIG. 5, the bibliographic information of the patent document information includes publication number information, patent classification information, applicant information, inventor information, and so on.

As the patent classification information, IPC (International Patent Classification) information, FI (file index) information, F term information (file forming term information), and so on are used. In addition to the above information, as the patent classification information, Current US Classification information can be used.

Main features of the information delivering apparatus 1 according to the first embodiment of the present invention are processes to form the characteristic information and the profile information of the patent document information to be stored in the profile storing section 104.

FIG. 6 is a flowchart showing processes for storing profile information in the profile storing section 104. In the flowchart shown in FIG. 6, processes are shown in which the information analyzing section 103 forms the characteristic information and stores the profile information in the profile storing section 104.

First, the condition information obtaining section 101 obtains delivering destination information via the network I/F 110 (S601). When a user operates one of the clients 2*a*, 2*b*, and 2*c* and transmits delivering destination information to the information delivering apparatus 1 via a network, the condition information obtaining section 101 of the information delivering apparatus 1 obtains the delivering destination information of the user.

FIG. 7 is a diagram showing an example of the delivering destination information to be obtained by the condition information obtaining section 101.

As shown in FIG. 7, the delivering destination information to be obtained by the condition information obtaining section 101 includes inventor information (the full name of an inventor); that is, inventor literal information showing a personal name, and e-mail address information of the inventor. That is, the condition information obtaining section 101 functions as a personal name information obtaining section. The personal name information obtaining section is established when a program loaded in the RAM 20 (see FIG. 2) is executed by the CPU 10 (see FIG. 2).

In other words, in S601, the user transmits the inventor information and the e-mail address information shown in FIG. 7 to the information delivering apparatus 1 by operating one of the clients 2a, 2b, and 2c. The e-mail address information is used when the information delivering apparatus 1 delivers information to the client 2 of the user.

The condition information obtaining section 101 sends the obtained delivering destination information to the conforming information extracting section 102. The conforming information extracting section 102 extracts document information from the information DB 200 which has the same inventor information as that in the delivering destination information (S602). That is, the conforming information extracting section 102 functions as an information extracting section which extracts personal name conforming information that conforms to the inventor information in the delivering destination information from the information DB 200.

In S602, the conforming information extracting section 102 extracts document information from the information DB 200 which has the same inventor information in the delivering destination information sent from the condition information obtaining section 101 as that in the information DB 200. That is, the inventor information in the delivering destination information obtained by the condition information obtaining section 101 in S601 is the condition information for extracting suitable document information from the information DB 200.

Figures 8, 9:
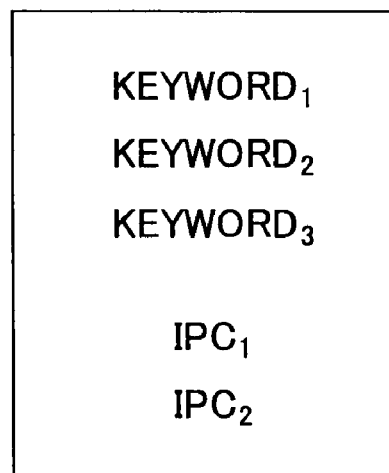
FIG. 8 is a diagram showing an example of document list information formed by a conforming information extracting section shown in FIG. 3.
FIG. 9 is a diagram showing an example of common information to be extracted in a process shown in FIG. 6.

The conforming information extracting section 102 extracts the document information from the information DB 200 by using the inventor information as the condition information, forms document list information showing a list of the extracted documents, and sends the formed document list information to the information analyzing section 103. FIG. 8 is a diagram showing an example of the document list information. As shown in FIG. 8, the document list information includes a document No. showing the document information extracted in S602 and a document ID for uniquely identifying the document No. In FIG. 8, the document No. is, for example, an unexamined patent publication No. In the first embodiment of the present invention, a case is described in which document information of documents is extracted in S602.

The information analyzing section 103 extracts common characteristics among the documents in the document list information by accessing the information DB 200 while receiving the document list information from the conforming information extracting section 102 (S603). Specifically, in S603, the information analyzing section 103 extracts keywords which are commonly used in, for example, the abstract information, the claim information, and the detailed description of invention information of the documents in the document list information. Alternatively, the information analyzing section 103 extracts classification information, for example, IPC information which is commonly used in the bibliographic information of the documents in the document list information.

FIG. 9 is a diagram showing an example of common information to be extracted in S603. In the example shown in FIG. 9, $KEYWORD_1$, $KEYWORD_2$, $KEYWORD_3$, $IPC_1$, and $IPC_2$ are shown.

$KEYWORD_1$, $KEYWORD_2$, and $KEYWORD_3$ are commonly used keywords in the abstract information, the claim information, or the detailed description of invention information of the documents in the document list information. $IPC_1$, and $IPC_2$ are commonly used IPC information in the bibliographic information of the documents in the document list information. The information shown in FIG. 9 is used as characteristic information which shows the characteristics of the documents in the document list information. As described above, when the keywords and the classification information are used, the characteristics of the contents relating to the inventor information designated by the delivering destination information obtained in S601 can be specified.

The common keyword is not limited to a keyword which is commonly used in all the documents; and it can be a keyword which is commonly used in two documents extracted in S602. In addition, the common IPC information is not limited to IPC information which is commonly used in all the documents, and can be IPC information which is commonly used in two documents extracted in S602. With this, the keywords and the classification information relating to the inventor information designated by the delivering destination information obtained in S601 can be extracted.

After forming the characteristic information (common information) shown in FIG. 9, the information analyzing section 103 forms profile information in which the e-mail address information in the delivering destination information obtained in S602 is related to the characteristic information, and stores the profile information in the profile storing section 104 (S604).

FIG. 10 is a diagram showing an example of the profile information stored in the profile storing section 104. As shown in FIG. 10, the profile information includes the keywords and the IPC information in the common information formed in S603, and the e-mail address information obtained in S601 and profile ID information for uniquely identifying a profile ID. In the profile information shown in FIG. 10, the keywords and the IPC information are used to calculate a conforming degree with the characteristic information of documents newly stored in information DB 200 as the characteristic information. In addition, the e-mail address information is used as delivering destination information when document information having a high conforming degree with the characteristic information of the documents newly stored in information DB 200 is delivered to the delivering destination.

Figure 11:
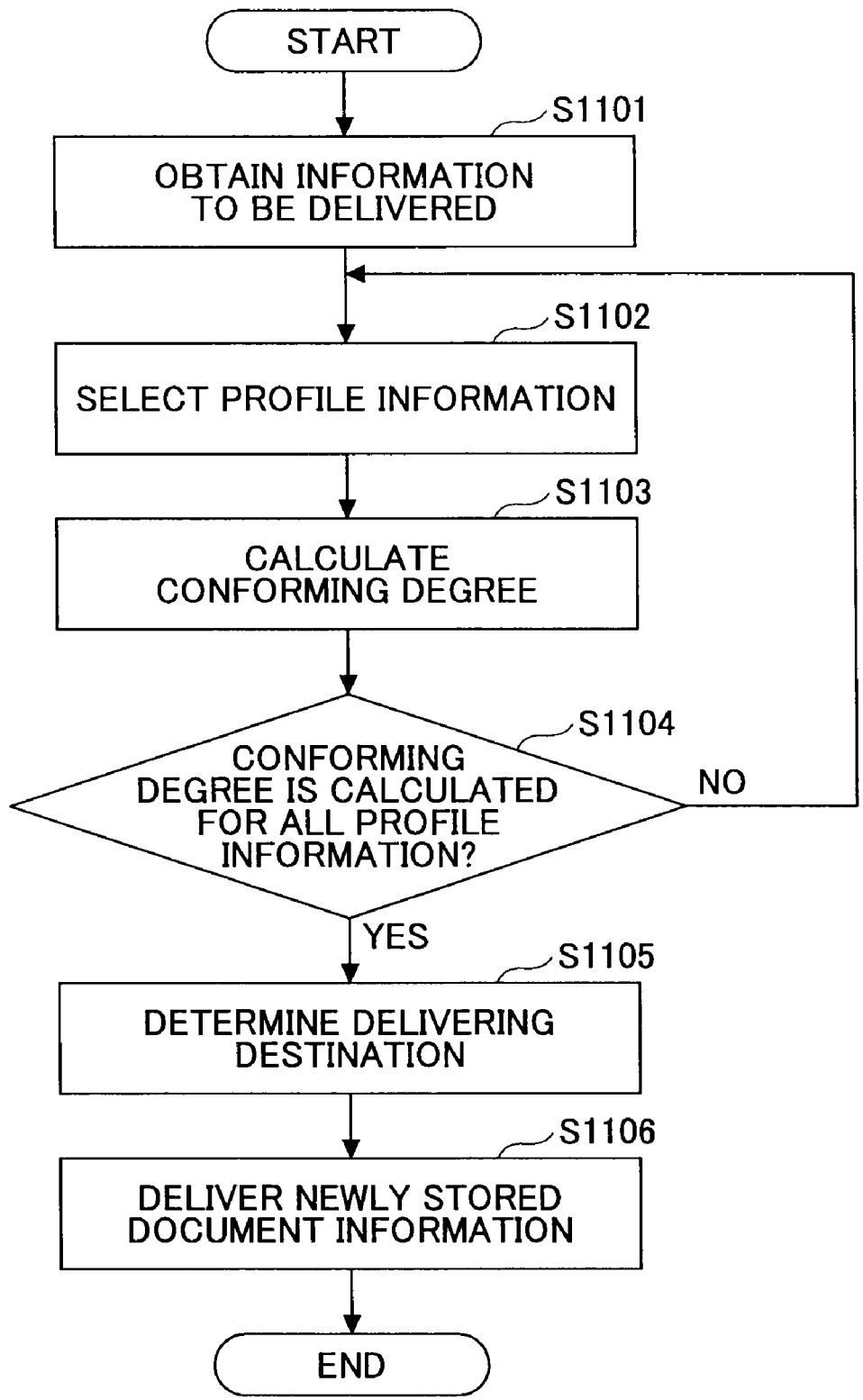
FIG. 11 is a flowchart showing processes when newly stored document information is delivered to a client according to the first embodiment of the present invention.

Next, in the information delivering apparatus 1 in the document information delivering system according to the first embodiment of the present invention, processes are described when document information is newly stored in the information DB 200 and the newly stored document information is delivered to an e-mail address. FIG. 11 is a flowchart showing processes when newly stored document information is delivered to a client.

When document information is newly stored in the information DB 200, the conforming information extracting section 102 obtains the newly stored document information as information to be delivered (S101). In S1101, the conforming information extracting section 102 can obtain the newly stored document information when the information DB 200 informs the conforming information extracting section 102 of storing the new document information. Alternatively, the conforming information extracting section 102 can obtain the newly stored document information by periodically access the information DB 200.

Next, the conforming information extracting section 102 selects one of the profile information records (characteristic information of keywords and IPC information shown in FIG. 10) stored in the profile storing section 104 (S1102). The conforming information extracting section 102 calculates the conforming degree between the selected characteristic information in S1102 and the characteristic information of the newly stored document information obtained in S1101 (S1103).

The conforming information extracting section 102 calculates the conforming degree based on the number of times using a keyword of the characteristic information obtained from the profile storing section 104 in the newly stored document information and/or whether the IPC information of the characteristic information obtained from the profile storing section 104 exists in the newly stored document information.

As the calculating method of the conforming degree, an existing known method in information searching technology can be used; therefore, the detailed description of the method is omitted. The conforming information extracting section 102 temporarily stores the calculated conforming degree by having a relationship with the profile ID of the selected profile information record.

The processes from S1102 to S1103 are applied to all profile information records stored in the profile storing section 104. Then the conforming information extracting section 102 determines whether the conforming degree is calculated for all the profile information records stored in the profile storing section 104 (S1104).

When the conforming degree is not calculated for all the profile information records stored in the profile storing section 104 (NO in S1104), the process returns to S1102. Then the conforming information extracting section 102 repeats the processes in S1102 and S1103 and temporarily stores the calculated conforming degree by having a relationship with the ID of selected profile information record.

Figure 12:
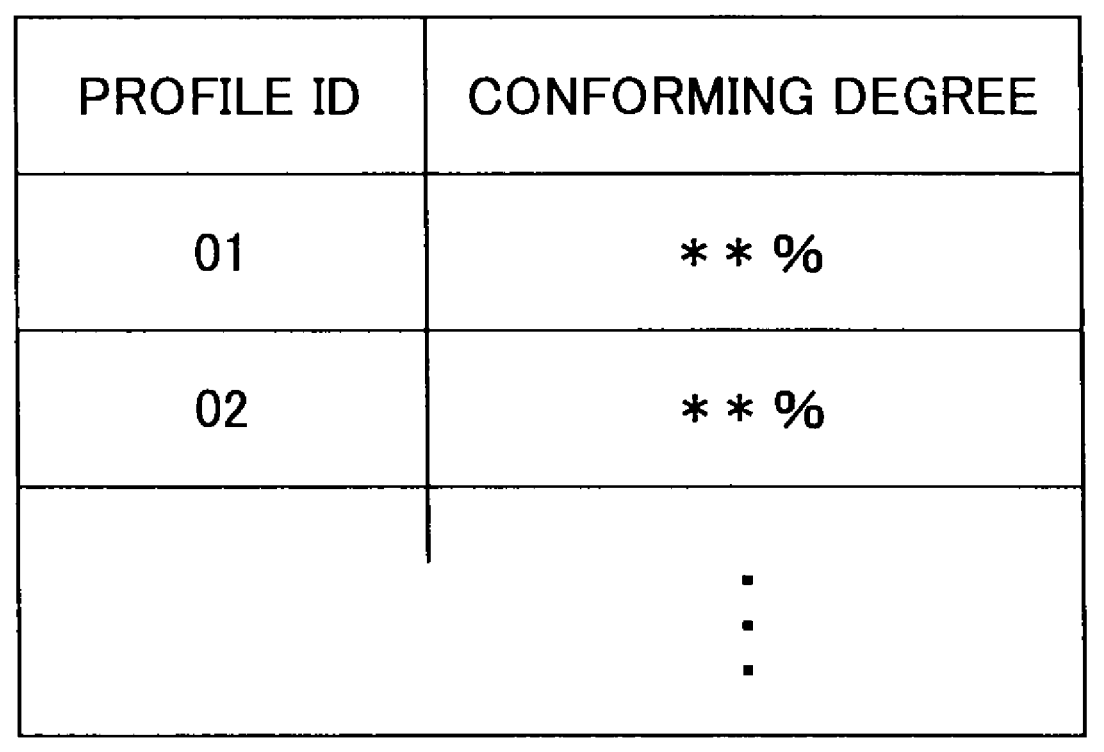

FIG. 12 is a table showing an example of a relationship between the conforming degree and the profile ID. As shown in FIG. 12, when the processes of S1102 and S1103 are repeated, the table shown in FIG. 12 is formed in which the profile ID is related to the conforming degree calculated based on the characteristic information in the profile information.

When the conforming degree is calculated for all the profile information record stored in the profile storing section 104 (YES in S1104), the conforming information extracting section 102 refers to a profile ID whose conforming degree is highest, and determines that an e-mail address of the profile ID having the highest conforming degree is a delivering destination of the newly stored document information (S1105).

Then the conforming information extracting section 102 sends the e-mail address related to the profile ID determined in the profile information of the profile storing section 104 and the newly stored document information obtained in S1101 to the new information delivering section 105.

The new information delivering section 105 delivers the newly stored document information received from the conforming information extracting section 102 to the delivering destination of the e-mail address received from the conforming information extracting section 102 via the network I/F 110 (S1106). That is, the new information delivering section 105 functions as an information delivering section. The information delivering section is established when a program loaded in the RAM 20 (see FIG. 2) is executed by the CPU 10 (see FIG. 2). By the processes described above, the newly stored document information is delivered to a designated client.

As described above, in the first embodiment of the present invention, when a delivering destination of document information newly stored in the information DB 200 is determined, conforming degrees between the contents (characteristic information) of the newly stored document information and the characteristic information in the profile information records stored in the profile storing section 104 are calculated. The newly stored document information is delivered to an e-mail address of the profile information having the highest conforming degree of the profile information records. With this, inefficiency in which the newly stored document information is delivered to plural e-mail addresses can be decreased. In addition, since the newly stored document information is delivered to one of the e-mail addresses stored in the profile storing section 104, all e-mail addresses not recognizing the newly stored document information is prevented.

In the first embodiment of the present invention, when the characteristic information in the profile information to be stored in the profile storing section 104 is formed, a full name of an inventor of a patent document stored in the information DB 200 is obtained. The document information of the inventor is extracted from the information DB 200, and the profile information is formed so that the characteristic information from the extracted document information is related to an e-mail address of the inventor.

It can be assumed that an inventor works in a technical field of an invention of the inventor or a technical field related to the invention. Therefore, document information extracted by designating an inventor has a high probability of being related to the technical field of the inventor. That is, when the profile information is formed of the characteristic information such as a keyword and classification information, for example, IPC information, which is common in the document information extracted by designating the inventor, the characteristic information showing the characteristics of the technical field of the invention of the inventor or the technical field related to the invention can be suitably formed. That is, the characteristic information in the profile information can be easily and accurately formed.

When a user utilizes the information delivering apparatus 1 in the first embodiment of the present invention, the user operates one of the clients 2a, 2b, and 2c, and inputs delivering destination information shown in FIG. 7 (the full name of the user and the e-mail address of the user) to the information delivering apparatus 1 via the client 2. With this, the user can receive the newly stored document information in the information DB 200 related to the invention in the past of the user.

As described above, in the information delivering system using the information delivering apparatus 1 according to the first embodiment of the present invention, when newly stored document information is delivered, condition information for determining the delivery of the newly stored document information can be easily formed.

In FIG. 7, the delivering destination information to be obtained by the condition information obtaining section 101 includes the full name of the inventor as the inventor information and the e-mail address of the inventor as the e-mail address information. However, the e-mail address information is not limited to the e-mail address of the inventor. For example, when the inventor is transferred to another department, the full name of the inventor is used as the inventor information and an e-mail address of a successor is used as the e-mail address information.

In addition, in the above description, as the inventor information, the full name of one inventor is used. However, when the number of patent documents applied by the inventor is small, for example, the number is only one, the characteristic information which is common in the plural patent documents cannot be extracted. Therefore, plural full names can be designated as the inventor information. In this case, in S602 of FIG. 6, the conforming information extracting section 102 extracts the document information from the information DB 200 which has one of the plural inventors.

In addition, when the number of patent documents applied by the inventor is one, the characteristic information which is common in the plural patent documents cannot be extracted. However, in this case, for example, a word repeatedly used in one document can be determined to be a keyword. With this, even if the number of the inventions by the inventor is one, the same effect as that described above can be obtained.

Second Embodiment

Next, a second embodiment of the present invention is described. In the second embodiment of the present invention, a case is described in which the number of the patent documents by an inventor is one.

Figure 13:
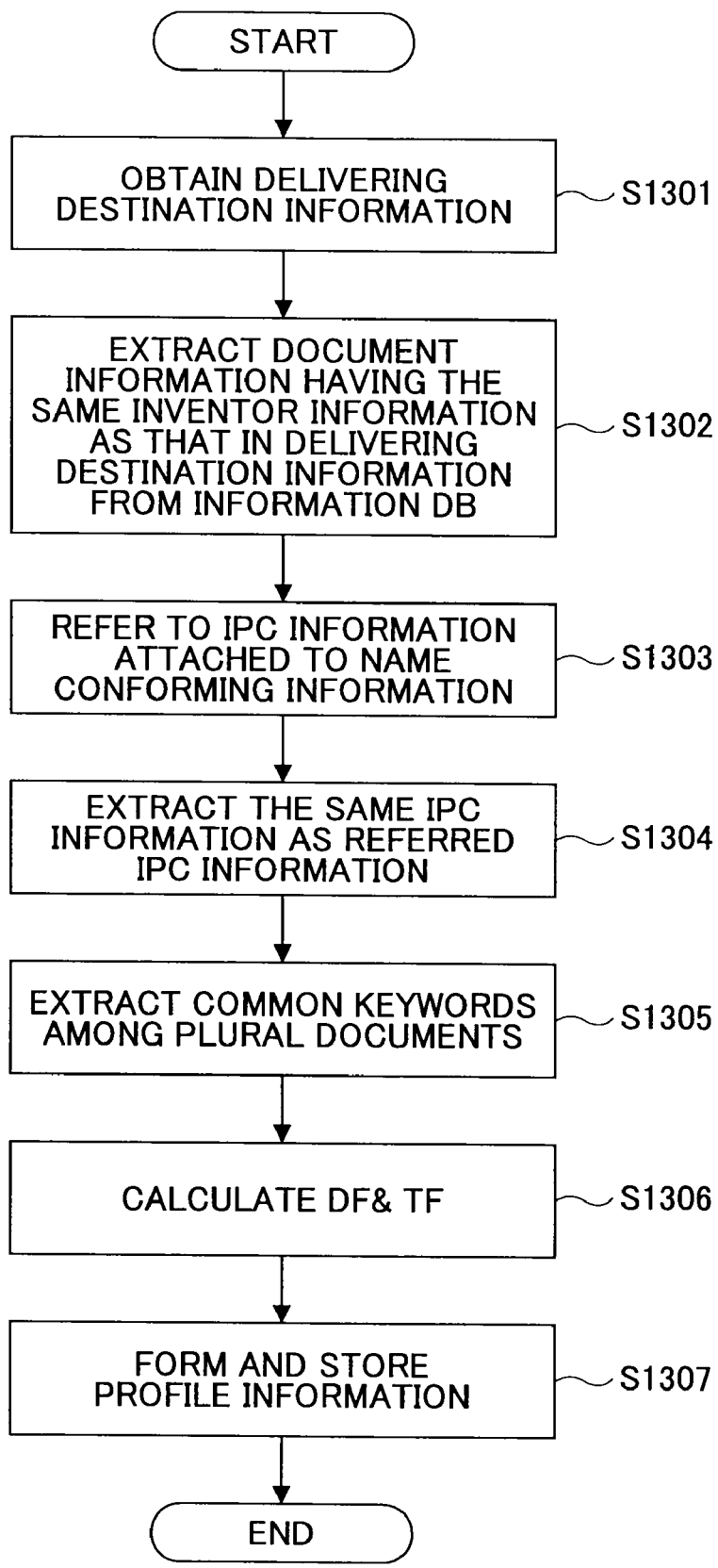
FIG. 13 is a flowchart showing processes for storing the profile information in the profile storing section shown in FIG. 3.

FIG. 13 is a flowchart showing processes for storing profile information in the profile storing section 104. In the flowchart shown in FIG. 13, processes are shown in which the information analyzing section 103 forms the characteristic information and stores the profile information in the profile storing section 104.

Referring to FIG. 13, the processes are described.

Similar to those shown in FIG. 6, the condition information obtaining section 101 obtains delivering destination information via the network I/F 110 (S1301), and the conforming information extracting section 102 extracts document information from the information DB 200 which has the same inventor information as that in the delivering destination information (S1302). That is, (personal) name conforming information is extracted.

When the document information extracted by the conforming information extracting section 102 is one, that is, the number of patent documents in the document list information is one, the information analyzing section 103 refers to IPC information attached to the name conforming information (S1303). The information analyzing section 103 extracts document information having the same IPC information as that in the referred IPC information from the information DB 200 (S1304). That is, the information analyzing section 103 extracts document information of documents having the same IPC information from the information DB 200. The process in S1304 can be performed by the conforming information extracting section 102 with the use of the IPC information received from the information analyzing section 103.

Similar to that described in S603, the information analyzing section 103 extracts common keywords among the documents (S1305), and calculates a DF (document frequency) of the extracted keywords in the documents and a TF (term frequency) of the keywords (terms) used in the one document (S1306).

That is, the DF is the frequency of usage of the keywords in the documents and the TF is the frequency of usage of the keywords in one document.

When the DF of a keyword is great, the keyword is frequently used in the documents of the IPC information, and the keyword can be considered as an effective keyword showing the technical field of the invention. In addition, when the TF of a keyword is great, the keyword is frequently used in the document, and the keyword can be considered as an effective keyword showing the contents of the invention. In addition, when the TF of a keyword is great and the DF of the keyword is small, it is considerable that the keyword is frequently used in one document and is not frequently used in IPC information; therefore, the keyword can be an effective keyword showing the characteristics of the document.

The information analyzing section 103 forms the characteristic information based on the keywords having a high DF and/or a high TF, then similar to the process S604 shown in FIG. 6, the information analyzing section 103 forms profile information and stores the profile information in the profile storing section 104 (S1307). With this, even if the number of patent documents of the inventor designated in the delivering destination information is one, the profile information can be suitably formed.

In the processes in S603 shown in FIG. 6 and in S1305 shown in FIG. 13, the keyword is extracted as a commonly used word in the documents. However, the commonly used word is not limited to a completely identical meaning word, and can be a synonymous word and a similar word. For example, when a word "printing a character" is used in a document and a word "printing" is used in another document, these two words can be determined to be similar words.

Figure 14:
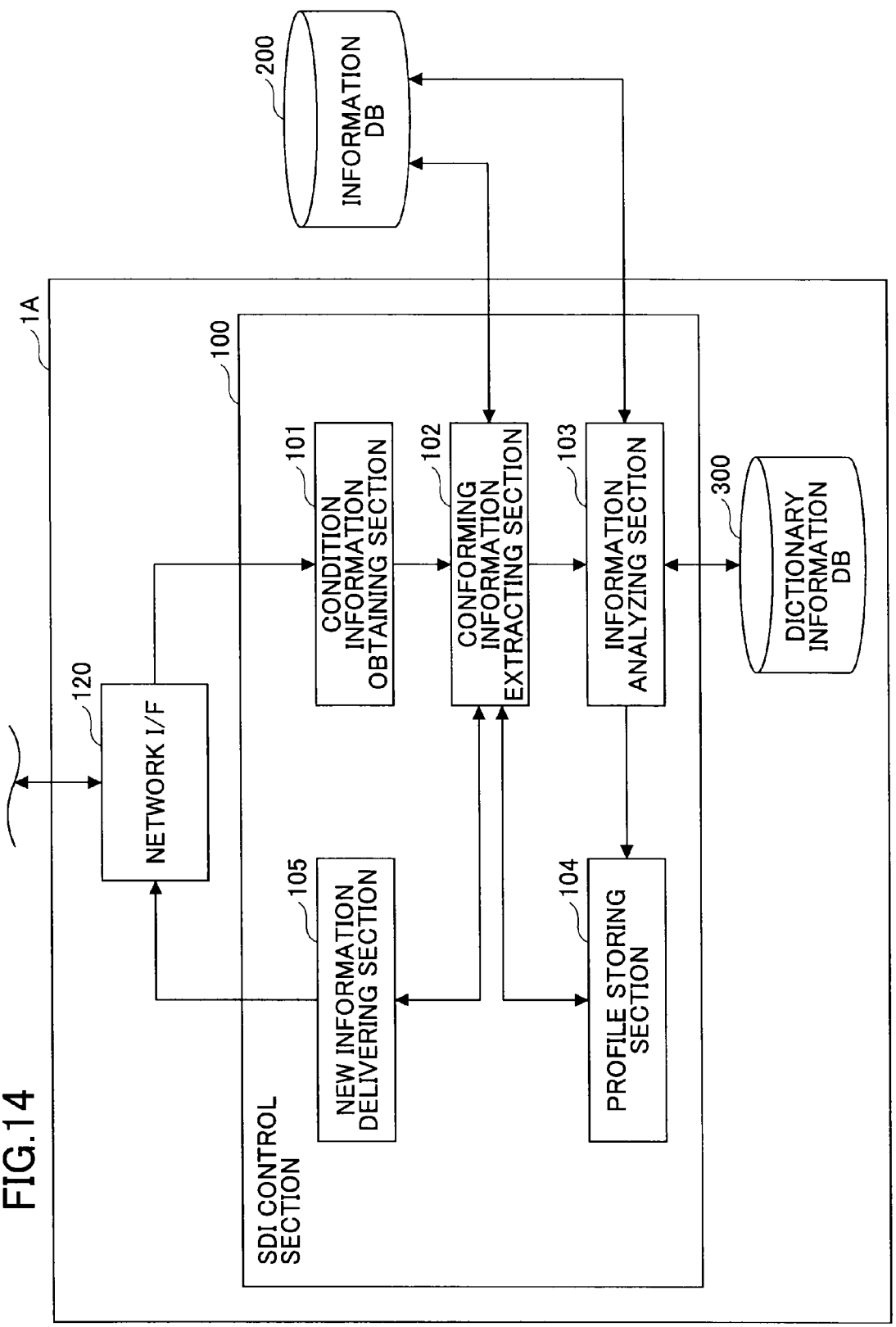
FIG. 14 is a diagram showing a functional structure of an information delivering apparatus according to a second embodiment of the present invention.

FIG. 14 is a diagram showing a functional structure of an information delivering apparatus 1A according to the second embodiment of the present invention. In FIG. 14, in addition to the functional structure of the information delivering apparatus 1A, the information DB 200 is shown in which document information to be searched for by the information delivering apparatus 1A is stored.

In FIG. 14, when an element is similar to or the same as that shown in FIG. 3, the same reference number as that shown in FIG. 3 is used for the element, and the same description as that related to FIG. 3 is omitted.

As shown in FIG. 14, when a dictionary information DB 300, in which information of synonymous words and similar words is stored, is included in the information delivering apparatus 1A, the above operations can be achieved.

In FIG. 14, when the information analyzing section 103 extracts, for example, a string "printing a character" from a document, the information analyzing section 103 obtains a word "printing" by accessing the dictionary information DB 300. When the information analyzing section 103 extracts the string "printing a character" or the word "printing" from another document, the information analyzing section 103 extracts the string "printing a character" or the word "printing" as a commonly used word in S603 shown in FIG. 3 or S1305 shown in FIG. 13.

In the first embodiment of the present invention, in S1105 of FIG. 11, the conforming information extracting section 102 determines that an e-mail address of the profile ID having the highest conforming degree is the delivering destination of the newly stored document information. With this, the newly stored document information is surely delivered to one of the users; that is, it can be delivered to any one of the users. However, the patent documents having various contents are published as unexamined patent publications, and in some cases, it is ineffective to send all the newly stored patent documents to any one of the users.

In order to solve the above problem, it is conceivable that a threshold value be determined for the conforming degree calculated in S1103. That is, even if the profile ID determined in S1105 has the highest conforming degree, when the conforming degree is less than a predetermined threshold value or is the predetermined threshold value or less, the newly stored document information is not delivered to the determined delivering destination. With this, newly stored document information, which is not required to be confirmed by the user, cannot be delivered to the user of the determined delivering destination.

The threshold value is determined whether newly stored patent document information is to be delivered to any one of the users. That is, in order not to deliver patent document information whose conforming degree with the characteristic information in the profile information stored in the profile storing section 104 is low, the threshold value is determined.

The threshold value is determined to be a value corresponding to a calculation system of the conforming degree in S1103. For example, in a calculation system, the conforming degree between the selected characteristic information in S1102 and the characteristic information of the newly stored document information obtained in S1101 is calculated. When the two characteristic information sets do not match each other, the conforming degree is determined to be "0%"; and when both of the characteristic information sets slightly match each other, the conforming degree is determined to not be "0%". In another calculation system, the threshold value can be determined to be a value other than "0%".

As another method for solving the inefficiency of the unrelated document information delivery, the IPC information stored in the profile information as the characteristic information can be used. For example, in S1103 of FIG. 13, even if a high conforming degree is calculated based on only matching the keywords, when the IPC information items do not match each other or are not similar, a delivering destination is excluded and unrelated patent document information is not delivered to the delivering destination.

The IPC information has classifications of SECTION, SUBSECTION, CLASS, MAIN GROUP, and SUBGROUP. The similarity in the IPC information does not mean that the IPC information is matched in all the classifications of SECTION, SUBSECTION, CLASS, MAIN GROUP, and SUBGROUP. For example, when the IPC information is matched in only SECTION, or in SECTION and SUBSECTION without matching in lower classifications of CLASS, MAIN GROUP, and SUBGROUP, it is determined that the similarity exists.

In the first embodiment of the present invention, the newly stored patent document information is delivered to the e-mail address of the profile ID having the highest conforming degree in the profile information stored in the profile storing section 104. However, the newly stored patent document information can be delivered to all the e-mail addresses of the profile IDs having the conforming degree satisfying the threshold value described above.

In addition, when the profile information of users belonging to different organizations (departments) is stored in the profile storing section 104, it is preferable that the delivery of the newly stored patent document be performed in each organization. In many cases, information is frequently exchanged among users in one organization and information is hardly exchanged among users belonging to different organizations.

FIG. 15 is a diagram showing another example of the profile information stored in the profile storing section 104. As shown in FIG. 15, when an organization ID is added to the profile information stored in the profile storing section 104, the above operations can be performed.

In FIG. 15, the profile information of organizations having organization IDs "001" and "002" is stored in the profile storing section 104. Therefore, in the organization ID "001", newly stored patent document information is delivered to one of the e-mail addresses of the profile IDs "01", "03", and "06" having the highest conforming degree calculated in S1103. In addition, in the organization ID "002", newly stored patent document information is delivered to one of the e-mail addresses of the profile IDs "02", "04", and "05" having the highest conforming degree calculated in S1103.

As shown in FIG. 15, in a case where the profile information having the organization ID is stored in the profile storing section 104, when the delivering destination information is obtained in S601 of FIG. 6, the information of the organization to which the inventor belongs must be obtained.

FIG. 16 is a diagram showing another example of the delivering destination information to be obtained by the condition information obtaining section 101. As shown in FIG. 16, when a user transmits delivering destination information by using one of the clients 2a, 2b, and 2c to the information delivering apparatus 1, the user transmits organization information, in addition to the inventor information and the e-mail address information, to the information delivering apparatus 1. With this, the condition information obtaining section 101 can obtain the information of the organization ID to be stored in the profile storing section 104.

The organization information shown in FIG. 16 can be the information of the organization ID shown in FIG. 15, or can be text information showing the organization name of the inventor. When the organization information shown in FIG. 16 is the text information showing the organization name of the inventor, the condition information obtaining section 101 must obtain an organization ID to be stored in the profile storing section 104 as the profile information based on the text information.

Third Embodiment

Figure 17:
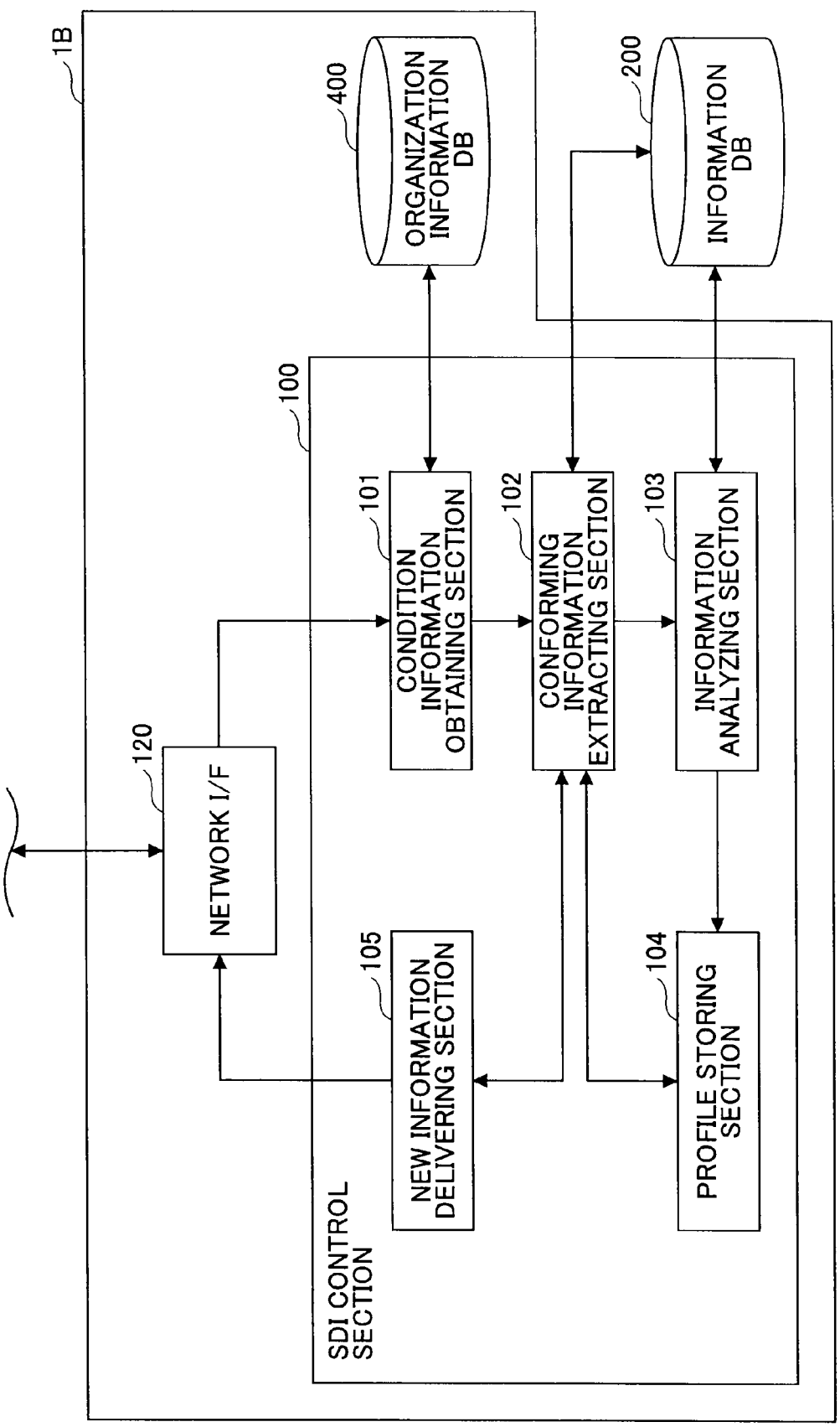
FIG. 17 is a diagram showing a functional structure of an information delivering apparatus according to a third embodiment of the present invention.

FIG. 17 is a diagram showing a functional structure of an information delivering apparatus 1B according to a third embodiment of the present invention. In FIG. 17, in addition to the functional structure of the information delivering apparatus 1B, the information DB 200 is shown in which document information to be searched for by the information delivering apparatus 1B is stored.

In FIG. 17, when an element is similar to or the same as that shown in FIG. 3, the same reference number as that shown in FIG. 3 is used for the element, and the same description as that related to FIG. 3 is omitted.

As shown in FIG. 17, when the information delivering apparatus 1B includes an organization information DB 400, the organization ID can be obtained by referring to the organization information DB 400.

FIG. 18 is a table showing an example of information to be stored in the organization information DB 400. As shown in FIG. 18, literal information showing an organization name and an organization ID uniquely determined for the organization name are stored in the organization information DB 400 as being related to each other. The condition information obtaining section 101 obtains the organization ID, which is related to the text information of the organization name included in the obtained delivery destination information, from the organization information DB 400. With this, the organization ID can be obtained from the text information of the organization name.

In S602 of FIG. 6, the conforming information extracting section 102 extracts document information having the same inventor information in the delivering destination information as that in the information DB 200 from the information DB 200. However, in this case, when two persons have the same full name, the two persons cannot be distinguished. In order to solve the problem, in the delivering destination information, it is conceivable that applicant information be added to the inventor information. Generally, in many cases, the applicant information is determined to be name information of a company to which the inventor belongs. Generally, it is conceivable that a case is rare in which inventors having the same full name are in charge of one technical field in one company. Therefore, when the applicant information is designated, patent document information can be divided into two parts based on the applicant information.

In addition, as described in FIG. 10, the keywords are used as the profile information. However, instead of using the keywords, for example, image information can be used as the profile information. In an image search, when the image information in the document information to be searched for is converted into a one-dimensional symbol string and image information to be input as a search condition is converted into a one-dimensional symbol string, conforming information can be extracted by using a method similar to the method for searching for a word. Therefore, the embodiments of the present invention can be applied to another search such as the image search, in addition to the word search.

In the embodiments of the present invention, the patent documents are objects to be searched for. However, the embodiments of the present invention can be applied to a case in which books in a library are searched for. In this case, NDC (Nippon Decimal Classification) information is used for classifying books instead of using the IPC information.

As described above, in the information delivering apparatus according to the embodiments of the present invention, condition information for determining the delivery of information can be easily formed.

Further, the present invention is not limited to the specifically disclosed embodiments, and variations and modifications may be made without departing from the scope of the present invention.

The present invention is based on Japanese Priority Patent Application No. 2008-102928, filed on Apr. 10, 2008, with the Japanese Patent Office, the entire contents of which are hereby incorporated herein by reference.

What is claimed is:

1. An information delivering apparatus which delivers content newly stored in an information storing unit to a client, comprising:
    a personal name information obtaining section which obtains personal name information of the client;
    an information extracting section which extracts a plurality of pieces of personal name conforming information including the personal name information from the information storing unit;
    a characteristic information forming section which extracts keyword information which is included in the plurality of pieces of personal name conforming information from the plurality of pieces of personal name conforming information and forms characteristic information;
    a delivering destination information storing section which stores the characteristic information and delivering destination information to where information including a characteristic shown by the characteristic information is delivered so that the characteristic information is related to the delivering destination information;
    a conforming information extracting section which calculates a conforming degree for each delivering destination information, wherein the conforming information extracting section calculates the conforming degree for each delivering destination information based on a number of times a keyword included in the characteristic information associated with the delivering destination information stored in the delivering destination information storing section is used in a content to be delivered which is newly stored; and
    an information delivering section which delivers the content to be delivered to a delivering destination shown by the delivering destination information related to the characteristic information based on the conforming degree.

2. The information delivering apparatus as clamed in claim 1, wherein:
    when the information extracting section extracts the personal name conforming information of a plurality of persons, the characteristic information forming section forms the characteristic information by extracting characteristic information showing common characteristics among the personal name conforming information of the plural persons.

3. The information delivering apparatus as darned in claim 1, wherein:
    the characteristic information is literal information showing words which are used in the extracted personal name conforming information.

4. The information delivering apparatus as darned in claim 1, wherein:
    the characteristic information is classification information for classifying contents disclosed in the extracted personal name conforming information.

5. The information delivering apparatus as darned in claim 4, wherein:
    the information stored in the information storing unit is disclosed patent document information, and
    the classification information is symbolic information of at least one of IPC (International Patent Classification) information, FI (file index) information, F term information (file forming term information), and Current US Classification information.

6. The information delivering apparatus as clamed in claim 1, wherein:
    the delivering destination information storing section stores a plurality of different pieces of the characteristic information so that the plural different pieces of the characteristic information are related to a plurality of different pieces of the delivering destination information; and
    the information delivering section delivers the newly stored information to a delivering destination shown by the delivering destination information whose characteristic information has a highest conforming degree with the characteristic information of the newly stored information.

7. The information delivering apparatus as clamed in claim 1, wherein:
    when the conforming degree between the characteristic information of the newly stored information and the characteristic information stored in the delivering destination information storing section is a predetermined threshold value or more, the information delivering section delivers the newly stored information to a delivering destination shown by the delivering destination information related to the characteristic information stored in the delivering destination information storing section.

8. The information delivering apparatus as darned in claim 1, wherein:
    the personal name information is information of a person who created contents which disclose the newly stored information in the information storing unit.

9. The information delivering apparatus as clamed in claim 8, wherein:
    the information stored in the information storing unit is disclosed patent document information; and the personal name information is information of an inventor who has disclosed the newly stored information in the information storing unit.

10. An information delivering method in an information delivering apparatus which delivers content newly stored in an information storing unit to a client, the information delivering apparatus including a personal name information obtaining section, an information extracting section, a characteristic information forming section, a delivering destination information storing section, a conforming information extracting section and an information delivering section, the information delivering method comprising:

obtaining personal name information of the client by the personal name information obtaining section;

extracting a plurality of pieces of personal name conforming information including the personal name information from the information storing unit by the information extracting section;

extracting keyword information which is included in the plurality of pieces of personal name conforming information from the plurality of pieces of personal name conforming information and forming characteristic information by the characteristic information forming section;

storing the characteristic information and delivering destination information to where information including a characteristic shown by the characteristic information is delivered so that the characteristic information is related to the delivering destination information by the delivering destination information storing section;

calculating a conforming degree for each delivering destination information by the conforming information extracting section calculating the conforming degree for each delivering destination information based on a number of times a keyword included in the characteristic information associated with the delivering destination information stored in the delivering destination information storing section is used in a content to be delivered which is newly stored; and delivering the content to be delivered to a delivering destination shown by the delivering destination information related to the characteristic information based on the conforming degree.

11. A computer-readable recording medium storing an information delivering program for executing the information delivering method as claimed in claim 10.

* * * * *